Nov. 18, 1941.  R. W. CLIFFORD  2,262,835
VALVE
Original Filed Nov. 3, 1939
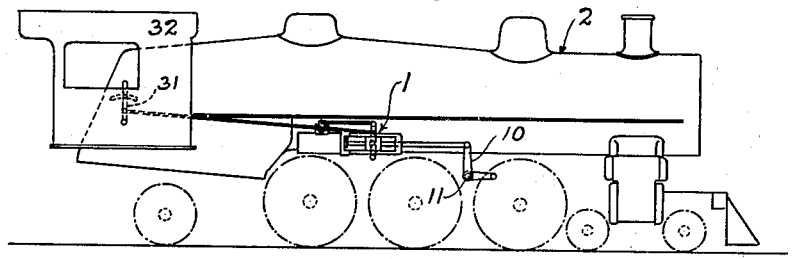
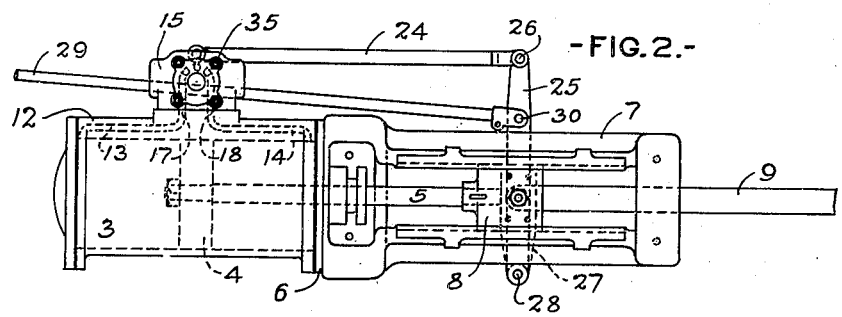
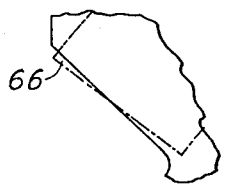
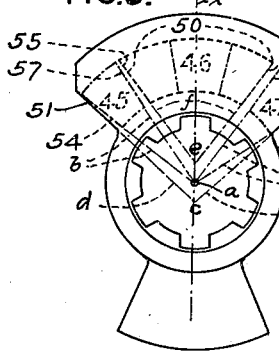
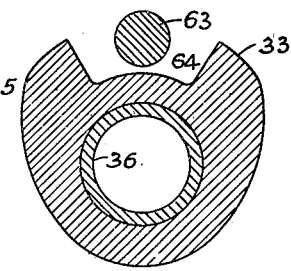
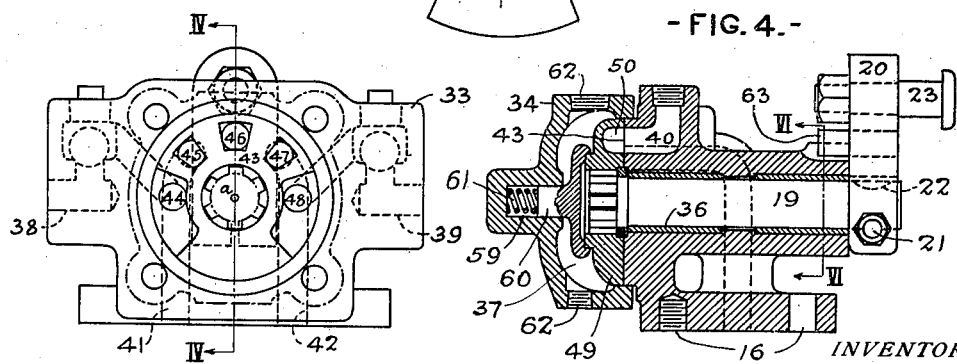
INVENTOR
Roger W. Clifford
By
S. C. Yeaton
ATTORNEY Patented Nov. 18, 1941

2,262,835

UNITED STATES PATENT OFFICE 2,262,835

VALVE

Roger W. Clifford, Schenectady, N. Y., assignor to American Locomotive Company, New York, N. Y., a corporation of New York Original application November 3, 1939, Serial No. 302,654. Divided and this application July 19, 1940, Serial No. 346,296

2 Claims. (Cl. 121—41)

This invention relates to valves and more particularly to control valves for power mechanisms, such for instance as power reverse gear mechanisms.

This application is a division of my co-pending application for Letters Patent for improvements in Power reverse gears, filed November 3, 1939, Serial No. 302,654, now abandoned.

An object of the invention is to provide an improved type of rotary valve.

A further object is to provide a control valve adapted to admit, through ports, pressure-actuating fluid to a power cylinder gradually and exhaust it therefrom gradually during initial flow, and thereafter at a rapidly increasing rate until full port opening is obtained, thereby producing a rapid smooth flow of fluid.

Referring to the drawing forming a part of this application, Figure 1 is a diagrammatic side elevation of a locomotive embodying the present invention; Fig. 2 is an enlarged front elevation, viewed from the side of the locomotive, of the reverse gear mechanism shown in Fig. 1, the reach rods extending therefrom being broken away; Fig. 3 is a front view of the valve of the present invention with certain parts removed; Fig. 4 is a section on the line IV—IV of Fig. 3, showing the entire valve, certain parts being shown in full; Fig. 5 is an enlarged front view of the valve element, the ports controlled thereby being indicated in dot and dash lines; Fig. 6 is an enlarged section on the line VI—VI of Fig. 4, various parts not being shown; and Fig. 7 is an enlarged diagrammatic view of a portion of the valve element of Fig. 5, showing the position of the valve element relative to an admission port, indicated in dot and dash lines, after initial opening movement in a clockwise direction.

The power reverse gear mechanism, of which the present invention is especially adapted as a part thereof, is similar to the mechanism described in my above mentioned copending application, employing a type of servo-motor, and reference may be had thereto for a fuller description of the parts not particularly important for a clear understanding of the present invention. The following description will therefore be brief except as to the particular structure involved in the present invention. It will be understood that while the valve of the present invention has been described in connection with a power reverse gear mechanism, for which it is especially adapted, it may be used for various other purposes.

In power reverse gear mechanism of the present type, where a rotary valve is employed, the valve includes a valve element which is initially manually moved by the locomotive engineer through lever means in the cab, to effect, through the agency of fluid pressure, movement of the reverse gear piston to its desired setting. The moving piston, through mechanical means including a floating lever, effects return movement of the valve element. The valve element, upon reaching its normal position, effects through the fluid pressure agency, arresting of the piston movement at its desired setting.

In some types of conventional reverse gear mechanisms, the piston is mechanically held in set position against the disturbing forces of the distribution valve gear and against creeping caused by the loss in piston area at the piston rod side of the piston due to the cross-sectional area of the piston rod. In other types, such as the instant case, the fluid in the cylinder is relied upon to hold the piston, and where the fluid is a gas, such as air or steam, the tendency to creep is aggravated and is a factor which must be rectified by the control valve. Movement of the piston due to the above mentioned disturbances will move the valve element of the reverse gear valve which in turn will effect return of the piston to its desired proper position.

The mechanism, besides reversing the valve gear which reverses the direction of travel of the locomotive, also operates to adjust the valve gear for different cut-offs, that is to say the piston of the mechanism operates as a control for the valve gear. Nevertheless the mechanism is commonly termed "a power reverse gear," and therefore, for convenience, is so termed in the description, and in the claims appended hereto.

The power reverse gear mechanism shown is an improved mechanism forming the subject matter of my above-mentioned co-pending application. However, the particular mechanism used is not important insofar as the present invention is concerned, and this mechanism is chosen for illustrative purposes only. The instant valve is adapted for use with conventional reverse gear mechanisms, and with other types of servo-motors.

The power reverse gear mechanism, indicated generally by the reference numeral 1, is of the follow-up type aforedescribed and is shown applied to a locomotive 2. It comprises a cylinder 3, a piston 4 disposed therein, a piston rod 5 extending from the piston through a cylinder head 6 at the forward end of the cylinder, a crosshead guide 7 secured to the head 6, a crosshead 8 slidable in the guide and secured to the forward end of the piston rod, and a reach rod 9 secured at its rear end to the crosshead and at its forward end to a lever 10 mounted on a locomotive reverse shaft 11.

An air chest 12 is formed on top of the cylinder 3. It comprises a block of metal, cast with the cylinder and extending the full length thereof in which are formed passages 13 and 14 extending from near the center of the chest (cylinder) to either end of the cylinder. The rotary valve 15 of the present invention is secured on top of the chest at the center part thereof by means of bolts and studs (not shown), orifices 16 being provided for this purpose. The valve is disposed over ports 17 and 18 formed in the chest, which are the external parts of the passages 13 and 14 respectively.

The valve controls the admission and exhaust of pressure fluid to and from either end of the cylinder. It includes a valve stem 19. A rocker arm 20 is secured at its lower end on the valve stem by means of a bolt 21 and key 22 for rotation with the valve stem, and at its upper end is pivotally connected, by means of a pivot pin 23, to the rear end of a floating lever rod 24. A floating lever 25 is pivotally connected at its upper end to the forward end of the rod 24 by a pivot pin 26, and at its lower end to the lower end of an arm 27, depending from the crosshead, by a pivot pin 28. A reach rod 29 is pivoted at its forward end by a pivot pin 30 to an intermediate portion of the floating lever, and at its rear end is secured to an operating lever 31 disposed in the locomotive cab 32.

The valve 15 is, generally speaking, of the type commonly used in power reverse gear mechanisms, but modified in accordance with the present invention. It consists of a valve body 33 and a cup-shaped valve body cap 34, which are secured together by studs 35. The valve body contains a transverse orifice in which are disposed bushings 36. The valve stem 19 is rotatably mounted in these bushings, projecting at its rear end through the rear face of the valve body for receiving the arm 20, and projecting at its other end into the space 37 provided between the valve cap and valve body. This space 37 provides the air chest of the valve 15.

The body 33 includes an air inlet passage 38, a steam inlet passage 39, an exhaust passage 40 and air or steam outlet passages 41 and 42. The valve operation is the same whether air or steam is employed and consequently, for simplicity, only the term "air" will be used in the following description. Each of these passages is open at one end to the exterior of the body 33 and at the other end terminates in a port in a vertical face 43 of the body 33 in the sequence, air inlet port 44 for passage 38, outlet port 45 for passage 41, exhaust port 46 for passage 40, outlet port 47 for passage 42, and steam inlet port 48 for passage 39. The outlet passages 41 and 42 communicate respectively with the passages 13 and 14; the inlet passage 38 is connected with a supply of air under pressure (not shown); the exhaust passage 40 opens to the atmosphere; and the steam passage 39 is either closed with a plug or connected with a steam supply (not shown), as an alternative actuating medium, when desired, all in the usual manner.

The passages are all cylindrical in shape but the ports 45, 46 and 47 are approximately keystone in shape. They are covered by a valve element 49 which is secured on the end of the valve stem projecting into the air chest, by a spline connection for rotation with the valve stem. The valve element contains a keystone-shaped chamber 50. The top and bottom edges of these keystone-shaped ports and of the chamber 50 are arcs struck from a common axis, indicated by the reference letter a, which axis coincides with the valve stem axis. The side edges of the keystone-shaped ports 45 and 47 are radial from this axis, as indicated by the dot and dash lines b. The side edges 51 and 52 of the element 49 which control the admission of air to the ports 45 and 47 are radial from a point c below the axis, as indicated by the dot and dash lines d. When the element is in normal position as shown in Fig. 5, the forward edge 52 crosses the forward side edge 53 of the port 47 to partly open the same, providing a lead, later to be mentioned, but the rear edge 51 does not cross the rear side edge 54 of port 45 but is rearward thereof, providing a lap. The side edges 55 and 56 of the chamber 50, which control the exhaust of air through the port 46, are radial from a point e above this axis a, as indicated by the dot and dash lines f, so that the edges 55 and 56 cross the adjacent edges 57 and 58 respectively of the port 45 or 47 when the valve is moved one way or the other from normal position. Obviously when edges initially cross there will be partial port opening. The purpose of this construction, which is the novel feature of the instant valve, will later more fully appear.

The valve body cap 34 contains a recess 59 having an axis coinciding with the axis a. In the recess 59 is disposed the stem of a valve follower 60, which follower bears against the element 49. The element 49 and follower 60 are housed in the cup of the cap 34. A coil spring 61 is disposed in the recess 59 between the outer end of the stem and the end wall of the recess opposite thereto. The spring exerts a pressure forcing the follower against the valve element and the valve element against the face 43. Threaded orifices 62 are provided in the top and bottom of the cap 34. Both are ordinarily closed with plugs (not shown), the upper orifice serving as an air admission port in place of the air inlet passage 38 when desired, and the lower orifice serving for drainage.

A dowel 63 is mounted in the rocker arm 20 and projects forwardly into a recess 64 formed in the adjacent portion of the valve body. This dowel limits the movement of the valve element which is initially moved by the lever 31, thereby preventing improper opening of the ports 45, 46 and 47.

The operation of the reverse gear mechanism is as follows:

The normal position of the valve element is the position the valve element assumes when the piston becomes balanced and is dependent upon such factors as the piston rod diameter and the load (piston-moving forces) imposed by the distribution valve gear upon the piston. That is to say, the source air pressure on the piston is affected in its action by the loss in piston area due to the piston rod and by forces exerted on the piston by the weight of the valve gear mechanism. Thus the piston moves, in the present case, forward a certain extent dependent upon these factors, swinging the valve element out of central position into its normal position, at which position, for compensation, the port 47 is slightly open as aforesaid and the port 45 is closed.

When the lever 31 is in a fixed position for a certain steam valve cut-off and the locomotive is in motion, the valve element 49 is in normal position as shown in Fig. 5, at which time its forward edge 52 crosses the adjacent edge 53 of the port 47, leaving the aforementioned slight opening or lead, indicated by the numeral 65. Air escapes from the chest 37 through this opening 65 into the passage 42 from which it goes to the forward part of the cylinder and maintains a pressure on the forward side of the piston sufficient to compensate for the aforesaid factors to effect balancing of the piston, port 45 being closed. This balancing is maintained during running of the engine at various valve settings or reestablished if disturbed, as has already been described, the ports 45 and 47 being suitably controlled by the valve element to accomplish this.

Movement of the operating lever 31 operates the reverse gear in the usual manner and only a brief description thereof is deemed necessary. If the reverse lever is moved forward, the floating lever 25 is moved forward, about the axis of the pin 28 as a fulcrum, which rotates the valve element 49 clockwise, uncovering the port 45 gradually as is shown in Fig. 7, wherein is shown a port initial opening 66, and admitting air to the rear end of the cylinder. The piston 4 is therefore moved forward, the air at the forward side of the piston passing through passage 42 and port 47, which is then in communication with chamber 50, and out through the exhaust port 46 and passage 40 to the atmosphere. The forward edge 56 crosses the inner edge 58 of the port 47 gradually in a manner similar to the crossing of the outer edge of the port 45 by the rear edge 51 of the element 49 and therefore exhausts the forward end of the cylinder gradually. Forward movement of the piston moves the crosshead 8 and reach rod 9 forward which in turn adjusts the valve gear of the locomotive.

As the crosshead moves forward it moves the lower end of the floating lever 25 forward. The lever 25 fulcrums about the axis of the pin 30, the upper end therefore moving rearward, rotating the valve element 49 in a counter-clockwise direction and returning it to normal position. With the valve element in normal position, the total pressure is equalized on either side of the piston and the piston held in whatever position it may be in.

It will be understood that, similar to usual practice, in due course of operation the lever 31 will have reached its position for the desired cut-off setting and the engineer will then lock it in this position, thereby fixing the fulcrum pin 30.

Movement of the reverse lever in the opposite direction results in a similar but reverse cycle of operations.

If the edges 51 and 52 of the valve element 49 had been made radial of the axis $a$, openings serving for the same purpose as the openings 65 and 66, would have been provided in a conventional manner, but they would have extended for the full length of the sides of the ports 45 and 47. It has been found that, considering the opening of a closed port, such a port opening allows an undesirable sudden and excessive amount of air to enter the cylinder whenever the valve element moves from normal position. With the valve element in normal position very frequently the piston creeps enough to effect these port openings. The aforesaid conventional sudden excessive port opening is avoided in the present instance by disposing the control edges of the valve element 49 and ports 45 and 47 at different angles, for then the initial opening, produced by the moving element, being very small, has not the sudden excessive undesirable admission. The admission, however, rapidly increases as the element moves, due to the increase in the V-shaped opening produced by the crossing edges, to thereby insure quick action.

The exhaust also starts gradually and then rapidly increases, the edge 55 or 56 crossing, as aforesaid, either the edge 57 or 58 of the port 45 or 47. Whereas the edges 51 and 52 are drawn from a point below the axis $a$, the edges 55 and 56 are drawn from a point above the axis $a$ so that the first exhaust opening provided by the crossing edges will be, similar to the first admission opening, at the upper part of the port.

The aforegoing description has been of a power reverse gear mechanism wherein the unbalance of pressure on either side of the piston has been taken care of by the valve element lapping, considering only the flow of air to the cylinder, one admission port and providing a lead at the other admission port, namely the port leading to the piston rod side of the cylinder. The crossing edges providing opening 65 adapt the instant valve 15 to particularly provide for this unbalance as the lead provided for by opening 65 can be made very small, being for just a portion of the edge 53.

The instant valve, however, is also adapted for use in a mechanism wherein other means are provided to take care of the unbalance of piston pressures produced by certain causes, as for instance in the mechanism of my co-pending application, filed June 25, 1940, Serial No. 342,212, wherein a pressure-reducing valve is employed to equalize the total pressures on opposite sides of the piston.

The edges 54, 57, 58 and 53 of the two ports 45 and 47 all diverge along lines extending from a common point on the medial line between the two ports 45 and 47, indicated by the dot and dash line $x$ in Fig. 5, and preferably from the valve stem axis $a$ through which the medial line passes. The edges 51 and 52 of the valve element 49 diverge along lines from a common point $c$, and the edges 55 and 56 of the valve element diverge along lines from a common point $e$. The edges 51 and 55 define therebetween a flat blanking out face for the port 45, and likewise the edges 52 and 56 define therebetween a flat blanking out face for the port 47. The ports 45 and 47 and the blanking out faces, due to their respective converging side edges, are conveniently termed as being of keystone shape, this being a common shape of a keystone. The points $e$ and $c$ are preferably on the medial line between the two blanking out faces which line passes through the fixed point $a$. This medial line is not shown as it would be almost coincident with the medial line $x$, in the position of the valve element 49 as shown in Fig. 5. The valve element is preferably but not necessarily slightly rotated in Fig. 5, to provide a lead 65 which throws the medial line for the blanking out faces slightly to the left of the medial line $x$. Obviously this medial line for the blanking out faces will travel with the valve element 49 as it is being rotated.

While there has hereinbefore been described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. The combination of a power cylinder; a fluid controlled piston slidable in said cylinder; a control valve for said piston comprising a casing providing a fluid chamber, a shaft mounted in said casing, and a valve element mounted on said shaft within said chamber; and means for swinging said element about the axis of said shaft, said casing having a port for continuous supply of fluid to said chamber, and a fixed flat valve seat forming a wall of said chamber, said seat having a cylinder exhaust port and two keystone-shaped ports, one at each side of said exhaust port and spaced therefrom, said two ports communicating respectively with opposite ends of said cylinder for selective passage of fluid therethrough to said cylinder ends from said chamber and from said cylinder ends to said exhaust port, said two ports having straight sides diverging along lines all extending from a common center on the medial line between said two ports providing control edges for said two ports, said valve element having two keystone-shaped flat port blanking out faces, said blanking out faces slidably engaging said seat, for blanking out said two ports, and a recess opening into said exhaust port and extending at each side thereof to said blanking out faces, said blanking out faces having straight inner sides diverging along lines extending from a common center on the medial line between said blanking out faces and spaced from said first mentioned common center in a direction toward said blanking out faces providing control edges coacting each with an inner edge of said two ports for controlling the exhaust to said exhaust port, said blanking out faces further having straight outer sides diverging along lines extending from a common center on said last mentioned medial line and spaced from said first mentioned common center in a direction away from said blanking out faces providing control edges coacting each with an outer edge of said two ports for controlling the admission of fluid to said cylinder ends, all of said blanking out face edges, when said element is in central position and when swung, being each at an angle to its respective coacting port edge whereby gradually increasing V-shaped initial port opening and gradually decreasing V-shaped final port closing will be effected.

2. The combination of a power cylinder; a fluid controlled piston slidable in said cylinder; a control valve for said piston comprising a casing providing a fluid chamber, a shaft mounted in said casing, and a valve element mounted on said shaft within said chamber; and means for swinging said element about the axis of said shaft, said casing having a port for continuous supply of fluid to said chamber; and a fixed flat valve seat forming a wall of said chamber, said seat having a cylinder exhaust port and two keystone-shaped ports, one at each side of said exhaust port and spaced therefrom, said two ports communicating respectively with opposite ends of said cylinder for selective passage of fluid therethrough to said cylinder ends from said chamber and from said cylinder ends to said exhaust port, said two ports having straight sides diverging along radial lines all extending from said axis, providing radial control edges for said two ports, said valve element having two keystone-shaped flat port blanking out faces, said blanking out faces slidably engaging said seat, for blanking out said two ports, and a recess opening into said exhaust port and extending at each side thereof to said blanking out faces, said blanking out faces having straight inner sides diverging along lines extending from a common center on the medial line between said blanking out faces and spaced from said axis in a direction toward said blanking out faces providing control edges coacting each with an inner edge of said two ports for controlling the exhaust to said exhaust port, said blanking out faces further having straight outer sides diverging along lines extending from a common center on said medial line and spaced from said axis in a direction away from said blanking out faces providing control edges coacting each with an outer edge of said two ports for controlling the admission of fluid to said cylinder ends, all of said blanking out face edges, when said element is in central position and when swung, being each at an angle to its respective coacting port edge whereby gradually increasing V-shaped initial port opening and gradually decreasing V-shaped final port closing will be effected.

ROGER W. CLIFFORD.